(12) United States Patent
Schmidt

(10) Patent No.: US 12,042,975 B2
(45) Date of Patent: Jul. 23, 2024

(54) METHOD FOR OPERATING A VALVE UNIT AND VALVE UNIT

(71) Applicant: Eugen Seitz AG, Wetzikon (CH)

(72) Inventor: Joachim Schmidt, Hettlingen (CH)

(73) Assignee: Eugen Seitz AG, Wetzikon (CH)

( * ) Notice: Subject to any disclaimer, the term of this patent is extended or adjusted under 35 U.S.C. 154(b) by 166 days.

(21) Appl. No.: 17/732,079

(22) Filed: Apr. 28, 2022

(65) Prior Publication Data
US 2022/0347911 A1    Nov. 3, 2022

(30) Foreign Application Priority Data
Apr. 29, 2021    (EP) .................................... 21171205

(51) Int. Cl.
*B29C 49/42*    (2006.01)
*B29C 49/78*    (2006.01)

(52) U.S. Cl.
CPC ........ *B29C 49/4289* (2013.01); *B29C 49/783* (2013.01)

(58) Field of Classification Search
CPC ... B29C 49/783; B29C 49/4289; F16K 1/465; F16K 31/1228; F16K 31/122; F16K 1/427; F16K 31/1225
See application file for complete search history.

(56) References Cited

U.S. PATENT DOCUMENTS

| 2016/0332355 | A1  |    | 11/2016 | Rymann |              |
| 2022/0347910 | A1* | 11/2022 | Schmidt ............ | B29C 49/28008 |
| 2023/0321892 | A1* | 10/2023 | Ramsperger .......... | F16K 31/122 |
|              |     |         |                    | 251/63.5 |
| 2023/0400105 | A1* | 12/2023 | Schmidt ................... | F16K 1/36 |

FOREIGN PATENT DOCUMENTS

| EP | 1574771 A2    | 9/2005  |
| EP | 2142830 B1    | 11/2010 |
| EP | 2167303 B1    | 1/2011  |
| EP | 2402143 B1    | 4/2013  |
| EP | 3530431 A1    | 8/2019  |
| EP | 3105032 B1    | 10/2020 |
| WO | 2012034953 A1 | 3/2012  |
| WO | 2019105783 A1 | 6/2019  |
| WO | WO-2019105783 A1 * | 6/2019 ......... B29C 49/4289 |

OTHER PUBLICATIONS

WO-2019105783-A1, Elbs, Translation (Year: 2019).*

* cited by examiner

*Primary Examiner* — Daphne M Barry
(74) *Attorney, Agent, or Firm* — The Webb Law Firm

(57) ABSTRACT

Method for actuating a valve unit, which has a process pressure inlet, a process pressure outlet and a valve chamber connecting the process pressure inlet to the process pressure outlet and a movable piston for closing and opening the connection between the process pressure inlet and the process pressure outlet. The piston is able to be subjected on a first side to a first control pressure and the piston is able to be subjected on a second side to a second control pressure. The piston is moved by means of the first control pressure and the second control pressure for the purpose of closing and opening the connection. In the operating state of the valve unit, the piston is permanently subjected to the first control pressure, wherein the piston is additionally subjected to the second control pressure for moving the piston in one direction and wherein a pressure which is higher than atmospheric pressure and lower than the second control pressure is used as the first control pressure.

16 Claims, 2 Drawing Sheets

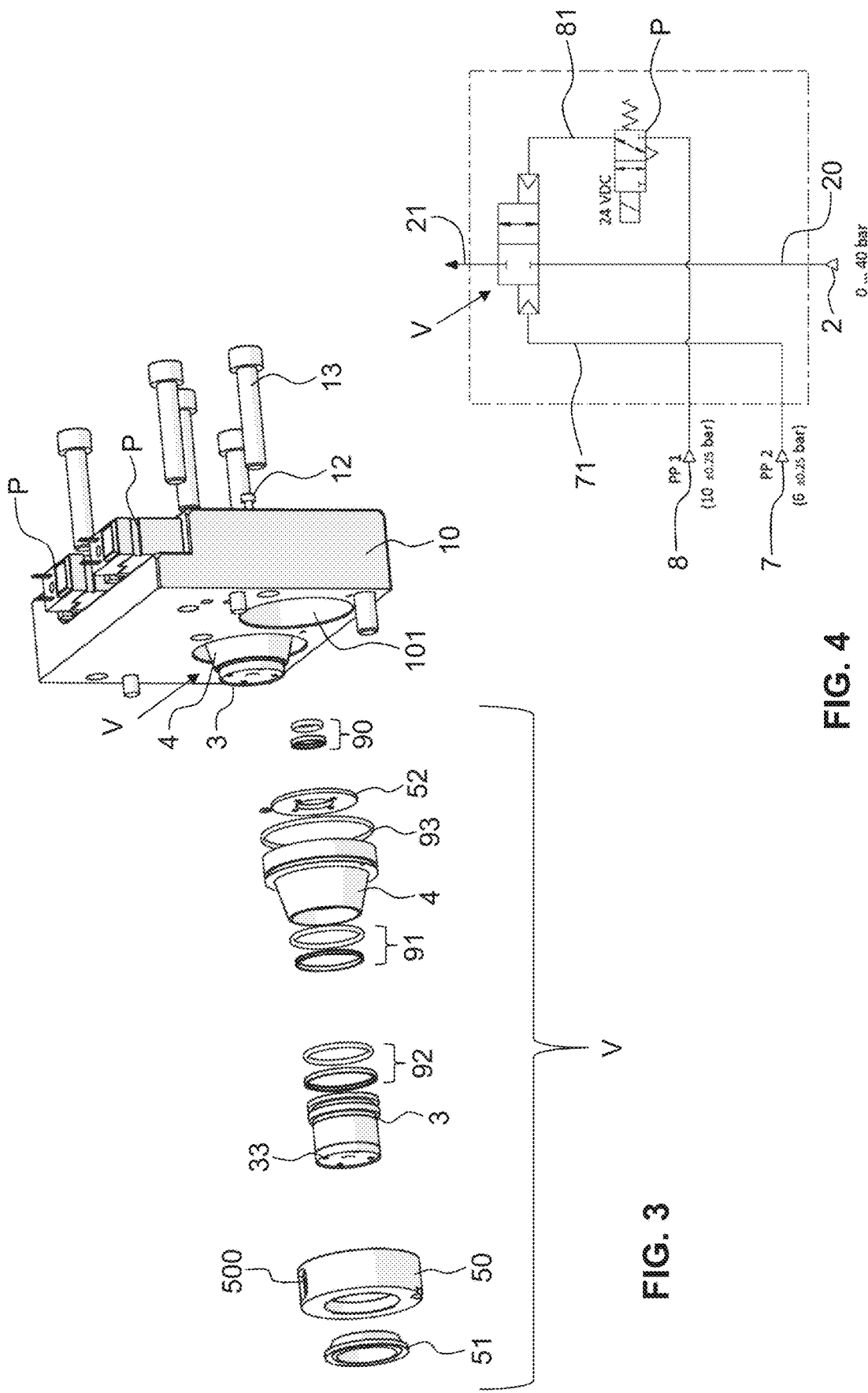

METHOD FOR OPERATING A VALVE UNIT AND VALVE UNIT

CROSS-REFERENCE TO RELATED APPLICATION

This application claims priority to European Patent Application No. 21 171 205.4 filed Apr. 29, 2021, the disclosure of which is hereby incorporated by reference in its entirety.

BACKGROUND OF THE INVENTION

Field of the Invention

The present invention relates to a method for operating a valve unit and a valve unit, in particular for pneumatic switching in a blow-moulding process. The valve unit is suitable, in particular, for use in a blow-moulding apparatus for moulding hollow bodies, in particular a stretch blow-moulding machine.

Description of Related Art

Blow-moulding apparatuses or blow-moulding machines for moulding hollow bodies are sufficiently well known from the prior art. Generally a pre-heated preform made from a thermoplastic material, preferably made from polyethylene terephthalate (PET), is connected to a blowing nozzle of the blow-moulding machine. The preform is expanded by blowing in a process gas, preferably compressed air. The desired shaped may be achieved by using blow moulds. Depending on the method, only blow-moulding is carried out, or the blank, i.e. the preform, is additionally stretched during the blow-moulding process by means of a displaceable mandrel or a displaceable stretching rod. This second method is called stretch blow-moulding.

The process gas is generally blown in via two or more steps. The pre-blowing takes place at a lower pressure than the subsequent main blowing. During the venting of the hollow body after the blow-moulding process, the process gas, in particular compressed air, is recovered and/or conducted to the outside.

The individual blow-moulding steps and the venting are controlled by means of valves. The production or moulding of such hollow bodies by means of blow-moulding machines takes place within a few seconds, preferably within 1 to 3 s. The fluid connections between the valves and the blowing nozzle should thus be as short as possible and dead spaces should be minimized as far as possible.

EP 1 574 771 A2 discloses an air-controlled valve for stretch blow-moulding machines. A lower valve chamber is located on a lower side of a movable piston. Said valve chamber connects a feed pressure inlet line to a feed pressure outlet line which are both arranged on this lower side of the piston. A connecting line connects the lower valve chamber to an upper valve chamber which is configured in a blind hole on the upper side of the piston. The piston forms an outwardly protruding ring, the lower side thereof serving as a control surface which may be subjected to a control pressure for actuating the valve. A further valve chamber which comprises ambient pressure is configured on an upper side of the ring.

EP 2 142 830 B1 and EP 2 167 303 B1 disclose air-controlled valves for hollow body blow-moulding machines. The valve has a connecting line running through the piston for the feed pressure. An outwardly protruding ring defines an annular lower control chamber and an annular upper control chamber. The two control chambers are connected to the same control pressure source. The upper control chamber is directly connected to the control pressure source, the lower control chamber may be selectively subjected to the control pressure by means of a valve and vented. As a result, the piston may be held in its closed position.

EP 3 105 032 B1 uses a 5/2-way valve in order to subject two control chambers, which are located above and below an outwardly protruding ring of the piston, selectively to a control pressure from the same control pressure source.

WO 2019/105783 A1 discloses a valve unit, the piston thereof forming a tapering sealing cap, wherein the sealing seat is formed from a soft material. This configuration is suitable, in particular, for rapidly switching process valves of an extrusion or stretch blow-moulding machine, for manufacturing hollow bodies from plastics material.

These valves have the drawback that the space requirement for the piston is relatively large. The use of two 3/2-way valves or one 5/2-way valve additionally increases the production costs. Moreover, these valves require a relatively large number of seals for each piston. This increases the production and maintenance costs. Additionally, the friction is increased thereby.

For many years attempts have been made to improve the process valves for hollow body blow-moulding machines, in particular for stretch blow-moulding machines, so that they have reaction times which are as short as possible, a switching behaviour which as far as possible is independent of the process pressure and additionally a compact and ergonomic design.

SUMMARY OF THE INVENTION

It is desirable, therefore, to provide an optimized valve unit which fulfils the three above-mentioned objects.

In the method according to the invention for actuating a valve unit, the valve unit has a process pressure inlet, a process pressure outlet and a valve chamber connecting the process pressure inlet to the process pressure outlet and a movable piston for closing and opening the connection between the process pressure inlet and the process pressure outlet. The piston is able to be subjected on a first side to a first control pressure and is able to be subjected on a second side to a second control pressure. The piston is moved by means of the first control pressure and the second control pressure for the purpose of closing and opening the connection. According to the invention, in the operating state of the valve unit the piston is permanently subjected to the first control pressure and the piston is additionally subjected to the second control pressure for moving the piston in one direction. In this case, a pressure which is higher than atmospheric pressure and lower than the second control pressure is used as the first control pressure.

The second side is arranged in an opposing direction so that the first and the second control pressures act in two mutually opposing directions.

In this case, "permanent" means that the first control pressure is applied continually and constantly during the operating time of the valve.

This valve unit thus may be actuated by means of a single pilot valve, preferably a single cost-effective and compact 3/2-way valve. The permanently applied control pressure acts as an air spring. As a result, the piston may be actuated very rapidly and thus fulfils in the best possible manner the requirements for a process valve for blow-moulding devices, relative to the desired reaction times.

Additionally, the piston and thus the entire valve unit may be configured in a relatively compact manner.

Moreover, a small number of seals is sufficient in order to seal the piston relative to a piston receiver, for example relative to a housing and/or a guide. This reduces the operating costs.

Preferably, the first control pressure is a pressure which is constant over time. "Constant over time" means in this context that in the operating state of the valve unit the pressure does not change or barely changes in terms of its value. Slight fluctuations in the pressure source are acceptable.

Preferably, the piston is held in its closed or in its open position by means of the first control pressure. Preferably, the valve unit is able to be used bidirectionally, preferably by reversing the pressure connections of the first and second control pressure chamber. As a result, the same valve type may be used for different fields of application, depending on where the permanent pressure source and the pilot valve with its further pressure source are connected.

Preferably, a piston is used which is pressure-compensated relative to a process pressure and which is exclusively moved by means of the first control pressure and the second control pressure. Such valve units have an optimal switching behaviour.

In preferred variants, the first control pressure acts on a central surface of the piston. This permits a compact and balanced design of the valve unit. In a preferred variant, the first control pressure acts on a surface which is configured to be recessed in the piston. Preferably, the second control pressure acts on an outer annular surface of the piston.

In other variants, the second control pressure acts on a central surface of the piston and the first control pressure acts on an outer annular surface of the piston, wherein the second control pressure preferably acts on a surface which is configured to be recessed in the piston.

The valve unit according to the invention is suitable, in particular, for the use of the aforementioned method. The valve unit according to the invention, in particular of a blow-moulding device, has a process pressure inlet, a process pressure outlet and a valve chamber connecting the processing pressure inlet to the process pressure outlet, and a movable piston for closing and opening the connection between the process pressure inlet and the process pressure outlet. The piston has on a first side a first control pressure surface which is able to be subjected to a first control pressure. The piston has on a second side, which opposes the first side, a second control pressure surface which is able to be subjected to a second control pressure. The piston is movable by means of the first control pressure and the second control pressure for the purpose of closing and opening the connection. According to the invention a) the first control pressure surface forms a central surface of the piston or b) the first control pressure surface forms an annular surface in an uppermost surface of the piston.

The second control pressure surface in each case forms an annular surface which protrudes outwardly from the piston.

This valve unit may be configured in a compact manner and with a minimum number of seals which seal the piston relative to the piston receiver, for example relative to a guide and/or a housing.

Preferably, the piston is configured to be pressure-compensated relative to the process pressure. This optimizes the switching behaviour of the valve unit.

In preferred embodiments, the first control pressure surface forms a central surface of the piston, which is arranged so as to be recessed in the piston.

Preferably, the valve chamber is a first valve chamber and the piston has at least one pressure-compensation bore which connects the first valve chamber to a second valve chamber which is arranged on the side of the piston opposing the first valve chamber. As a result, a compact valve unit which is pressure-compensated relative to the process pressure may be provided.

Preferably, the first control pressure surface and the second control pressure surface are approximately, preferably exactly, of the same size. This facilitates the calculation of the optimal pressure ratios of the two control pressures.

The piston is pressure-compensated due to the surfaces being of the same size. The drive forces for the movement of the piston are minimized thereby, so that the control surfaces of the piston are minimized and overall the piston may be designed in a manner which is compact and small.

In preferred embodiments, the piston has a first process pressure surface and a second process pressure surface opposing the first process pressure surface, wherein the first process pressure surface and the second process pressure surface are approximately, preferably exactly, of the same size. This also permits the formation of a valve which is pressure-compensated relative to the process pressure.

Preferably, the piston has a longitudinal axis and the first control pressure surface and the second control pressure surface are arranged adjacently to one another along the longitudinal axis. The length of the piston may be minimized thereby, and thus also the size of the entire valve unit.

The use of a guide apron inside a valve housing, which holds and guides the switching piston and which forms at least partially an inner boundary of at least one part of the valve chamber, is an independent invention and thus is also claimed without the remaining features. This relates, in particular, to such guide aprons which taper in the external diameter thereof and which are, in particular, of conical configuration. In particular, such valves may also be operated in a different manner, for example with two pilot valves and without a permanently applied control pressure.

Moreover, the entire embodiment of the compact process valve is claimed as a separate and independent invention. In particular, the compact design of the piston with the recessed upper control chamber and the guide pin of the upper housing part protruding into the recess is thus claimed separately. The process valve may also be operated in a different manner, for example with two pilot valves and without a permanently applied control pressure.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

FIG. 3 shows an exploded view through a part of the valve unit according to FIG. 1 and FIG. 4 shows a circuit diagram of the valve unit according to FIG. 1.

DESCRIPTION OF THE INVENTION

Figure 1:
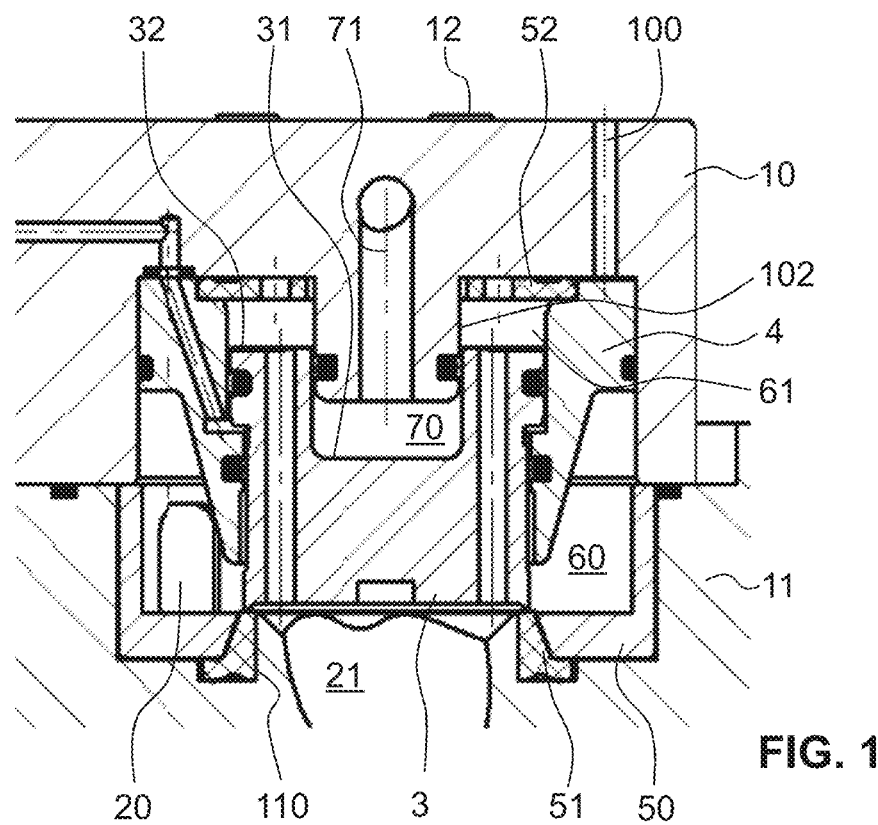
FIG. 1 shows a longitudinal section through a valve unit according to the invention in the closed position.
Figure 2:
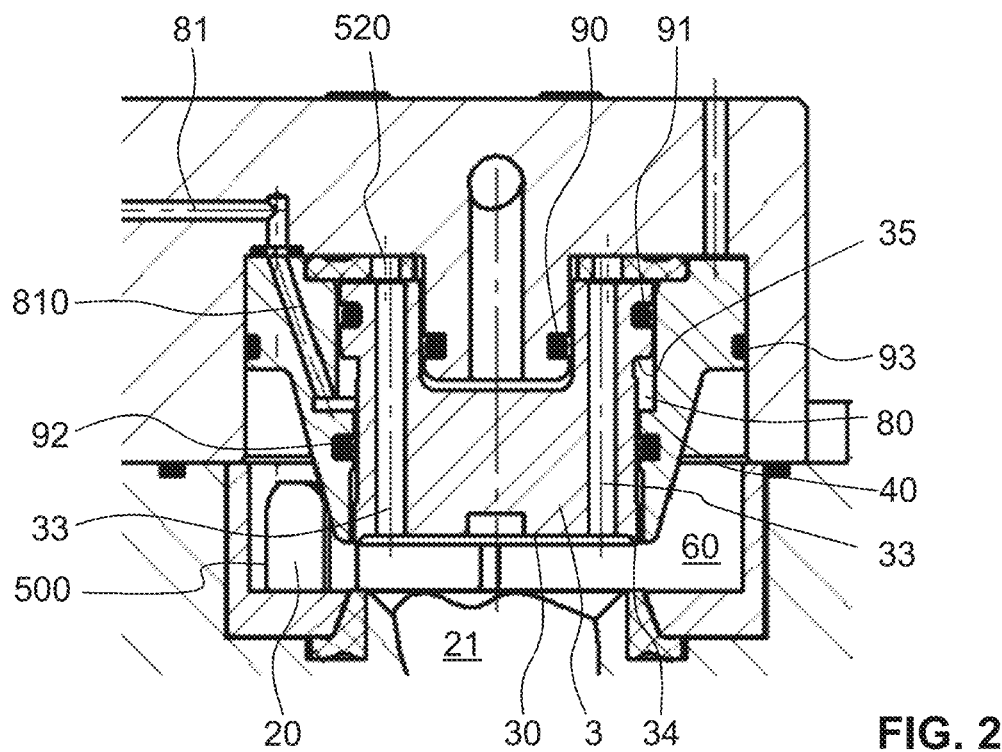
FIG. 2 shows the valve unit according to FIG. 1 in the open position.

In FIGS. 1 and 2 a valve unit according to the invention having a process valve, preferably a blowing valve of a blow-moulding machine, is shown. The blowing valve is, for example, a main blowing valve or a pre-blowing valve.

The valve unit has substantially one piston 3 and one piston receiver in which the piston 3 is movably held and in which valve chambers and control chambers are configured.

The piston receiver is configured differently depending on the embodiment. The piston receiver is formed, for example, by a separate single-piece or multi-piece housing. In other embodiments, it is part of a control block of a blow-moulding machine. In further embodiments, the piston receiver is, for example, part of a control block and a cover, wherein it comprises further components or only consists of these two components.

In the example shown here, the piston receiver is formed by a guide apron 4 and a lower housing part 11 and upper housing part 10. The two housing parts 10, 11 form a cavity, the guide apron 4 being fixedly arranged therein. The guide apron 4 surrounds the piston 3, which is displaceable in the longitudinal direction relative to the guide apron 4 and thus relative to the two housing parts 10, 11.

A lower housing part 11 is, for example, a control block of a blow-moulding machine, a blowing nozzle running therethrough. An upper housing part 10 is, for example, a valve block, the pilot valve of the valve unit being additionally fastened thereto. Depending on the exemplary embodiment, the two housing parts 10, 11 form more than one cavity for receiving such valve units.

The terms "lower" and "upper" refer to the orientation in FIGS. 1 and 2. The valve unit may be used in a different position. Thus "lower" and "upper" may also be understood to mean "first" and "second" without directional information relative to the position of the valve unit in three-dimensional space.

A valve block having two process valves V and associated pilot valves P for controlling the process valves V is shown in FIG. 3. For example, the valve block may be screwed in the form of a cover to a control block of a blow-moulding machine. The first fastening screws used therefor are identified in FIG. 3 by the reference numeral 12. A corresponding bore 100 for receiving the first fastening screws 12 is able to be identified in FIGS. 1 and 2.

This upper housing part 10 has circular cylindrical apertures 101 which correspond to the number of process valves V and which form blind holes. The base of the blind hole preferably forms a guide pin 102 protruding inwardly into the aperture 101 (FIGS. 1 and 2).

The process valves V are inserted from a first side into these apertures 101. The process valves are preferably releasably fastened to the upper housing part 10, preferably from the opposing side by means of the first fastening screws 12.

It is advantageous in this embodiment that the individual components of the process valve V, with the exception of the hold-down device 50 mentioned below and the seat seal 51, may be arranged and fastened together in the upper housing part 10 in order to be then fixed together with the upper housing part 10 to the lower housing part 11, for example to a control block, for example by means of second fastening screws 13. This facilitates the assembly but also the servicing of the valves.

The upper and lower housing part 10, 11 are preferably configured as solid components which are provided with apertures, bores and channels, where required.

Seals 90, 91, 92, 93, preferably sealing rings or sealing ring pairs, seal the guide apron 4 and the piston 3 relative to the housing parts 10, 11 and the piston 3 relative to the guide apron 4. A first sealing ring or a first sealing ring pair 90 forms a first seal between the guide pin 102 and the piston 3. A second sealing ring or a second sealing ring pair 91 forms a first seal between the piston 3 and the guide apron 4. A third sealing ring or a third sealing ring pair 92 forms a second seal between the piston 3 and the guide apron 4. A fourth sealing ring or a fourth sealing ring pair 93 forms a seal between the guide apron 4 and the upper housing part 10.

The piston 3 opens and closes a connection between a process pressure inlet line 20 coming from a process pressure source 2 (FIG. 4) and a process pressure outlet line 21 leading to the blowing nozzle of the blow-moulding machine. A corresponding lower valve chamber bears the reference numeral 60.

A seat seal 51 is arranged in the lower housing part 11. Said seat seal is preferably formed from a soft, resilient annular body. The seat seal 51 is preferably fixedly held, as shown here, by means of a hold-down device 50 in an aperture 110 of the lower housing part 11. The hold-down device 50 is preferably an annular body made of a rigid material. The hold-down device is preferably clamped by means of the upper housing part 10 and fixed in its position. Alternatively or additionally, the hold-down device is fixed by means of other fastening means to the lower housing part 11. For example, the hold-down device is directly screwed to the lower housing part 11. The hold-down device 50 preferably has a through-opening 500 in which the process pressure inlet line 20 leads into the lower valve chamber 60.

The piston 3 in the closed position bears against the seat seal 51 and thus closes the connection between the process pressure inlet line 20 and the process pressure outlet line 21. This is shown in FIG. 1. Preferably the piston 3 has a tapering circumferential sealing cap, preferably as described in WO 2019/105783 A1.

A stop ring 52 is arranged in the upper housing part 10 on the opposing side above the piston 3. Preferably, the stop ring is clamped between the guide apron 4 and upper housing part 10. Preferably, the stop ring 52 has at least one, preferably a plurality of, through-bores 520. The through-bores serve for pressure compensation.

The stop ring 52 is preferably manufactured from a softer material than the piston 3. Preferably, the stop ring is made from a soft and flexible material. The stop ring 52 surrounds an outer circumference of the guide pin 102. The stop ring is preferably clamped between a front face of the guide apron 4 and an inner surface of the upper housing part 10.

The guide apron 4 has substantially a cylindrical base body which transitions on its external side into a frusto-conical portion. The internal diameter of the guide apron 4 is substantially cylindrical, wherein it has a circumferential step 40. The guide apron 4 is preferably formed from a rigid material, preferably from metal. The process valve V is shown in the closed state in FIG. 1. The piston 3 protrudes over the free conical end of the guide apron 4, wherein it is guided by the apron 4.

The guide apron 4 is preferably fastened by means of the first fastening screws 12 to the upper housing part 10, wherein it also holds the piston 3 thereby in the upper housing part 10.

The piston 3 preferably has a relatively simple shape. The piston is preferably configured to be substantially cylindrical with a central recess on its upper side. The piston thus has a blind hole. The guide pin 102 of the upper housing part 10 engages in this recess. A first control chamber 70 is formed therebetween. The upwardly oriented front face 31 of the recess forms a first control surface.

A first control line 71 leads from a first control pressure source 7 (FIG. 4) through the guide pin 102 into this first control chamber 70.

The piston 3 has on its outer circumference a circumferential step with a lower control surface 35 which forms the counterpiece to the step 40 of the guide apron 4. A second control chamber 80 is configured between these two steps. A second control line 81, 810 leads from a second control pressure source 8 (FIG. 4) through the upper housing part 10 and through the guide apron 4 into this second control chamber 80.

The piston 3 has a region which protrudes in an annular manner over the recess and forms an external upper front face 32. The opposing lower front face 30 is located inside the sealing cap 34. These two front faces 30, 32 are connected via at least one, preferably a plurality of, connecting channels 33 which run through the piston 3. As a result, an upper valve chamber 61 which is connected to the lower valve chamber 60 is provided between the outer upper front face 32 and the upper housing part 10.

The outer upper front face 32 and the lower front face 30 are preferably of the same size, i.e. they have the same surface area dimension. As a result, the piston 3 is pressure-compensated relative to the process pressure.

The lower control surface 35 and the inner upper control surface 31 are preferably also of the same size. As a result, the piston is also pressure-compensated relative to these two surfaces. These surfaces may have, however, a different surface area dimension from the outer upper front face 32 and the lower front face 30.

A circuit diagram is shown in FIG. 4 which in combination with FIGS. 1 and 2 permits a functionality of the valve unit to be identified.

A process pressure, preferably 40 bar, is conducted by means of the process pressure source 2 via the process pressure inlet line 20 to the process valve V. The piston 3 of the process valve acts as an air-controlled switching piston which enables or closes the connection to the process pressure outlet line 21.

To this end, the first control chamber 70 is subjected to a first control pressure which is permanent and preferably constant over time. This is supplied by the first control pressure source 7 via the first control line 71. The first control pressure is higher than atmospheric pressure and is preferably ca. 6 bar.

The movement of the process valve V is now controlled by means of a single pilot valve P. The pilot valve P is connected to a second control pressure source 8 which provides a second control pressure. This second control pressure is higher than the first control pressure. It is preferably 10 bar.

Thus due to the first control pressure the process valve V is held in the first control chamber 70 in the closed position. The piston 3 is raised by applying the higher second control pressure in the second control chamber 80 and only process pressure prevails in the lower valve chamber 60, and in at least one connecting channel 33 and the upper valve chamber 61.

If the pilot valve P is closed and the second control pressure is absent, the piston 3 thus closes the connection between the process lines 20, 21 due to the first control pressure which is applied, as before, permanently to the inner upper front face or control surface. The permanently applied control pressure acts as a pneumatic spring, in particular as an air spring.

The control pressures and the process pressure are preferably generated by means of compressed air.

The valve unit according to the invention functions bidirectionally. Thus the second control chamber may be subjected to the permanent first control pressure and the first control chamber is able to be acted upon by the pilot valve and thus the selectively applied second control pressure. As a result, the process valve is always open and it may be closed by means of the pilot valve.

Moreover, the process pressure may be supplied to the process valve V in the reverse direction, without thereby changing the operating principle of the valve unit.

Moreover, the first control surface 31 may be of annular configuration and the upper front face 32, which forms the pressure-compensated counterpiece to the lower front face 30, may be formed in a recess or raised portion relative to the annular first control surface 31.

In a further embodiment, as before, the first control surface 31 is configured centrally as an inherently closed surface. However, the first control surface is configured to be raised relative to the upper front face 32.

The valve unit according to the invention may be configured in a cost-effective and compact manner.

LIST OF REFERENCE SIGNS

| | | | |
|---|---|---|---|
| 10 | Upper housing part | 50 | Hold-down device |
| 100 | Bore | 500 | Through-opening |
| 101 | Aperture | 51 | Seat seal |
| 102 | Guide pin | 52 | Stop ring |
| 11 | Lower housing part | 520 | Through-bore |
| 110 | Bore | | |
| 12 | First fastening screws | 60 | Lower valve chamber |
| | | 61 | Upper valve chamber |
| 2 | Process pressure source | | |
| 20 | Process pressure - inlet line | 7 | First control pressure source |
| | | 70 | First control chamber |
| 21 | Process pressure - outlet line | 71 | First control line |
| | | 8 | Second control pressure source |
| 3 | Piston | 80 | Second control chamber |
| 30 | Lower front face | 81 | Second control line |
| 31 | Inner upper front face | | |
| 32 | Outer upper front face | 90 | First annular seal |
| 33 | Connecting channel | 91 | Second annular seal |
| 34 | Sealing cap | 92 | Third annular seal |
| 35 | Lower control surface | 93 | Fourth annular seal |
| 4 | Guide apron | P | Pilot valve |
| 40 | Step | V | Process valve |

The invention claimed is:

1. A method for actuating a valve unit, wherein the valve unit has a process pressure inlet, a process pressure outlet and a valve chamber connecting the process pressure inlet to the process pressure outlet and a movable piston for closing and opening the connection between the process pressure inlet and the process pressure outlet, wherein the piston is able to be subjected on a first side to a first control pressure and wherein the piston is able to be subjected on a second side to a second control pressure,
   wherein the piston is moved by means of the first control pressure and the second control pressure for the purpose of closing and opening the connection,
   wherein, in the operating state of the valve unit, the piston is permanently subjected to the first control pressure,
   wherein the piston is additionally subjected to the second control pressure for moving the piston in one direction and
   wherein a pressure which is higher than atmospheric pressure and lower than the second control pressure is used as the first control pressure.

2. The method according to claim 1, wherein the first control pressure is a pressure which is constant over time.

3. The method according to claim 1, wherein the piston is held in its closed position or in its open position by means of the first control pressure.

4. The method according to claim 1, wherein the piston is pressure-compensated relative to a process pressure and exclusively moved by means of the first control pressure and the second control pressure.

5. The method according to claim 1, wherein the first control pressure acts on a central surface of the piston.

6. The method according to claim 1, wherein the first control pressure acts on a surface which is configured to be recessed in the piston.

7. The method according to claim 1, wherein the second control pressure acts on an outer annular surface of the piston.

8. The method according to claim 1, wherein the second control pressure acts on a central surface of the piston and wherein the first control pressure acts on an outer annular surface of the piston.

9. The method according to claim 8, wherein the second control pressure acts on a surface which is configured to be recessed in the piston.

10. A valve unit, in particular of a blow-moulding device, wherein the valve unit has a process pressure inlet, a process pressure outlet and a valve chamber connecting the process pressure inlet to the process pressure outlet, and a movable piston for closing and opening the connection between the process pressure inlet and the process pressure outlet, wherein the piston has on a first side a first control pressure surface which is able to be subjected to a first control pressure and wherein the piston has on a second side a second control pressure surface which is able to be subjected to a second control pressure, wherein the piston is movable by means of the first control pressure and the second control pressure for the purpose of closing and opening the connection, wherein a) the first control pressure surface forms a central surface of the piston or b) the first control pressure surface forms an annular surface in an uppermost surface of the piston and wherein the second control pressure surface forms an annular surface which protrudes outwardly from the piston, wherein the valve unit is capable of being controlled by one single pilot valve.

11. The valve unit according to claim 10, wherein the piston is configured to be pressure-compensated relative to the process pressure.

12. The valve unit according to claim 10, wherein the first control pressure surface forms a central surface of the piston, which is arranged so as to be recessed in the piston.

13. The valve unit according to claim 10, wherein the valve chamber is a first valve chamber and wherein the piston has at least one pressure-compensation bore which connects the first valve chamber to a second valve chamber which is arranged on the side of the piston opposing the first valve chamber.

14. The valve unit according to claim 10, wherein the first control pressure surface and the second control pressure surface are of the same size.

15. The valve unit according to claim 10, wherein the piston has a first process pressure surface and a second process pressure surface opposing the first process pressure surface and wherein the first process pressure surface and the second process pressure surface are of the same size.

16. The valve unit according to claim 10, wherein the piston has a longitudinal axis and wherein the first control pressure surface and the second control pressure surface are arranged adjacently to one another along the longitudinal axis.

* * * * *